(12) United States Patent
Pai et al.

(10) Patent No.: US 12,170,645 B2
(45) Date of Patent: *Dec. 17, 2024

(54) EDGE DEVICE FOR SOURCE IDENTIFICATION USING SOURCE IDENTIFIER

(71) Applicant: Juniper Networks, Inc., Sunnyvale, CA (US)

(72) Inventors: Raghuram Malpe Pai, Bangalore (IN); Nilesh Kantilal Simaria, Kanata (CA); Harsha Lakshmikanth, Bangalore (IN); Sri Ram Sankar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,418

(22) Filed: Sep. 27, 2023

(65) Prior Publication Data

US 2024/0022537 A1    Jan. 18, 2024

Related U.S. Application Data

(63) Continuation of application No. 17/449,067, filed on Sep. 27, 2021, now Pat. No. 11,811,721.

(51) Int. Cl.
*G06F 15/173* (2006.01)
*H04L 43/12* (2022.01)
*H04L 61/256* (2022.01)

(52) U.S. Cl.
CPC ............ *H04L 61/256* (2013.01); *H04L 43/12* (2013.01)

(58) Field of Classification Search
CPC .............................. H04L 61/256; H04L 43/12
See application file for complete search history.

(56) References Cited

U.S. PATENT DOCUMENTS

| | | | |
|---|---|---|---|
| 9,871,608 | B1 | 1/2018 | Chang et al. |
| 10,244,003 | B2 | 3/2019 | Gunnalan et al. |
| 10,318,408 | B2 | 6/2019 | Sun et al. |
| 10,516,761 | B1 | 12/2019 | A et al. |
| 10,791,421 | B1 | 9/2020 | Rothschild et al. |
| 10,862,862 | B2 | 12/2020 | Gupta et al. |
| 10,979,333 | B2 | 4/2021 | Bernoth et al. |
| 11,055,447 | B2 | 7/2021 | Lalit et al. |
| 11,258,684 | B2 | 2/2022 | Rangarajan et al. |

(Continued)

FOREIGN PATENT DOCUMENTS

CN          112020862 A     12/2020

OTHER PUBLICATIONS

Bjorklund, "Yang—A Data Modeling Language for the Network Configuration Protocol (NETCONF)," Internet Engineering Task Force (IETF), RFC 6020, Oct. 2010, 173 pp.

(Continued)

*Primary Examiner* — Duyen M Doan
(74) *Attorney, Agent, or Firm* — Shumaker & Sieffert, P.A.

(57) ABSTRACT

A device comprises processing circuitry configured to identify a telemetry packet indicating telemetry data for a plurality of packets output by a network device of a plurality of network devices and select a source identifier for the network device from a plurality of source identifiers. The processing circuitry is further configured to modify the telemetry packet to further indicate the selected source identifier and output the modified telemetry packet.

20 Claims, 8 Drawing Sheets

(56) References Cited

U.S. PATENT DOCUMENTS

| | | | |
|---|---|---|---|
| 11,811,721 | B2 | 11/2023 | Pai et al. |
| 2014/0079057 | A1* | 3/2014 | Groves, Jr. ............. H04L 43/04 370/392 |
| 2015/0201442 | A1* | 7/2015 | Kim ..................... H04W 76/12 370/329 |
| 2018/0139309 | A1 | 5/2018 | Pasam et al. |
| 2018/0307833 | A1 | 10/2018 | Noeth et al. |
| 2019/0104048 | A1* | 4/2019 | Nainar ................ G06F 11/3466 |
| 2020/0195517 | A1 | 6/2020 | Manthena |
| 2020/0195553 | A1 | 6/2020 | Yigit et al. |
| 2021/0218651 | A1 | 7/2021 | Rangarajan et al. |
| 2022/0173992 | A1* | 6/2022 | Filsfils .................. H04L 43/106 |
| 2022/0174012 | A1* | 6/2022 | Deshmukh ............. H04L 43/12 |

OTHER PUBLICATIONS

Enns et al. "Network Configuration Protocol (NETCONF)" Internet Engineering Task Force (IETF), RFC 6241, Jun. 2011, 113 pp.

Enns, "NETCONF Configuration Protocol," Network Working Group, RFC 4741, Dec. 2006, 95 pp.

Extended Search Report from counterpart European Application No. 21212608.0 dated May 30, 2022, 7 pp.

Harrington et al., "An Architecture for Describing Simple Network Management Protocol (SNMP) Management Frameworks," Network Working Group, RFC 3411, Dec. 2002, 64 pp.

Prosecution History from U.S. Appl. No. 17/449,067, dated Jan. 31, 2023 through Oct. 10, 2023, 32 pp.

Response to Extended Search Report dated May 30, 2022, from counterpart European Application No. 21212608.0 filed Sep. 25, 20023, 27 pp.

First Office Action and Search Report, and translation thereof, from counterpart Chinese Application No. 202111481030.5 dated May 14, 2024, 17 pp.

Notice of Intent to Grant and Text Intended to Grant from counterpart European Application No. 21212608.0 dated Apr. 30, 2024, 42 pp.

* cited by examiner

| 0 | 1 | 2 | 3 | 4 | 5 | 6 | 7 | 8 | 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| VERSION ||||||||||||||||| COUNT |||||||||||||||
| SYSTEM UPTIME ||||||||||||||||||||||||||||||||
| UNIX SECONDS ||||||||||||||||||||||||||||||||
| PACKAGE SEQUENCE ||||||||||||||||||||||||||||||||
| SOURCE ID 402 ||||||||||||||||||||||||||||||||

| Field Name | Value |
|---|---|
| Version | The version of NetFlow records exported in this packet; for Version 9, this value is 0x0009 |
| Count | Number of FlowSet records (both template and data) contained within this packet |
| System Uptime | Time in milliseconds since this device was first booted |
| UNIX Seconds | Seconds since 0000 Coordinated Universal Time (UTC) 1970 |
| Sequence Number | Incremental sequence counter of all export packets sent by this export device; this value is cumulative, and it can be used to identify whether any export packets have been missed Note: This is a change from the NetFlow Version 5 and Version 8 headers, where this number represented "total flows." |
| Source ID | The Source ID field is a 32-bit value that is used to guarantee uniqueness for all flows exported from a particular device. (The Source ID field is the equivalent of the engine type and engine ID fields found in the NetFlow Version 5 and Version 8 headers). The format of this field is vendor specific. In the Cisco implementation, the first two bytes are reserved for future expansion, and will always be zero. Byte 3 provides uniqueness with respect to the routing engine on the exporting device. Byte 4 provides uniqueness with respect to the particular line card or Versatile Interface Processor on the exporting device. Collector devices should use the combination of the source IP address plus the Source ID field to associate an incoming NetFlow export packet with a unique instance of NetFlow on a particular device. |

EDGE DEVICE FOR SOURCE IDENTIFICATION USING SOURCE IDENTIFIER

This application is a continuation of U.S. patent application Ser. No. 17/449,067, filed 27 Sep. 2021, the entire contents of which is incorporated herein by reference.

TECHNICAL FIELD

This disclosure relates to computer networks, and more particularly, to managing network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system allows administrators describe the intended network/compute/storage state. User intents can be categorized as stateful intents (e.g., business policies) or stateless intents. Stateful intents may be resolved based on the current state of a network. Stateless intents may be fully declarative ways of describing an intended network/compute/storage state, without concern for a current network state.

Intents may be represented as intent data models, which may be modeled using a unified graph model. Intent data models may be represented as connected graphs, so that stateful intents can be implemented across business computing architecture. For example, data models may be represented using data structures such as, for example, connected graphs having vertices connected with has-edges and reference (ref) edges. Controller devices may model intent data models as a unified graph model. In this manner, stateful intents can be implemented across intent data models. When intents are modeled using a unified graph model, extending new intent support may extend the graph model and compilation logic.

In order to configure devices to perform the intents, a user (such as a network administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to the device configuration model.

A sensor device may collect Internet protocol (TP) network traffic as the traffic enters and/or exits an interface and may output a telemetry packet based on the IP network traffic. By analyzing the data provided by the telemetry packet, the user (such as a network administrator) can determine telemetry data such as, the source and destination of network traffic, a class of service of the network traffic, and a cause of congestion of the network traffic. The user and/or a controller device may use an intent to modify the configuration of network devices using the telemetry data.

SUMMARY

In general, this disclosure describes techniques to identify a source of telemetry data generated by telemetry sensors. Some collector devices (e.g., a device configured to aggregate telemetry data for packets) may identify a source device (e.g., a network device) using a source Internet protocol (TP) address. However, such collectors may incorrectly identify a source device, for example, when a network address translator (NAT) translates a source address from the source IP address of the source device to another source IP address. Moreover, some cloud-based collectors may include a NAT to translate a source address from the source IP address of the source device to a source address of a node of the cloud-based collector, which may obscure the source device.

Rather than relying solely on a source IP address to identify a source device, and as described herein, a system may include an "edge device" arranged to decorate a telemetry packet by adding a device identifier (e.g., a device-id). In some examples, the device identifier may be a unique identifier for the source device that is preconfigured by a network administrator. For example, an edge device may append the device identifier to each telemetry packet. In this example, the collector device may identify the source device using the device identifier, which may improve an accuracy of identifying the source device compared to systems that use only a source IP address. Improving the accuracy of identifying the source device may help to improve an accuracy of telemetry information that can be used by a network administrator and/or a controller to manage network devices. For instance, a network administrator and/or controller may identify the largest resource drains bandwidth in a network.

In one example, a method includes identifying, by an edge device implemented in circuitry, a telemetry packet indicating telemetry data for a plurality of packets (e.g., a packet flow or a stream of packets) output by a network device of a plurality of network devices and selecting, by the edge device, a source identifier for the network device from a plurality of source identifiers. The method further includes modifying, by the edge device, the telemetry packet to further indicate the selected source identifier and outputting, by the edge device, the modified telemetry packet.

In another example, a device includes processing circuitry configured to identify a telemetry packet indicating telemetry data for a plurality of packets output by a network device of a plurality of network devices and select a source identifier for the network device from a plurality of source identifiers. The processing circuitry is further configured to modify the telemetry packet to further indicate the selected source identifier and output the modified telemetry packet.

In one example, a non-transitory computer-readable storage medium includes one or more instructions that cause processing circuitry to identify a telemetry packet indicating telemetry data for a plurality of packets output by a network device of a plurality of network devices and select a source identifier for the network device from a plurality of source identifiers. The one or more instructions further cause the processing circuitry to modify the telemetry packet to further indicate the selected source identifier and output the modified telemetry packet.

The details of one or more examples are set forth in the accompanying drawings and the description below. Other features, objects, and advantages will be apparent from the description and drawings, and from the claims.

BRIEF DESCRIPTION OF DRAWINGS

FIG. 4B is a conceptual diagram illustrating example details for the header of FIG. 4A, in accordance with the techniques of the disclosure.

Like reference characters refer to like elements throughout the figures and description.

DETAILED DESCRIPTION

In general, this disclosure describes techniques to identify a source of telemetry data of telemetry sensors. Some collector devices (e.g., a device configured to aggregate telemetry data for packets) may identify a source device (e.g., a network device or a telemetry sensor for a network device) using a source Internet protocol (IP) address. However, a collector device using only a source IP address to identify a source device may have a "gap" in reliably identifying the source of telemetry data of the telemetry sensors. For example, a telemetry packet may not contain a hostname or a management IP in payload. For instance, a source IP used for the telemetry packet may not be preserved across a network address translator (NAT). Additionally, or alternatively, a collector device using only a source IP address to identify the source device may be error prone because of the user datagram protocol (UDP) being unreliable, having no flow control, and being insecure compared to the transmission control protocol (TCP). Moreover, a collector device using only a source IP address to identify the source device may be unsuitable for multi-tenancy solutions when a source IP address for a first tenant may conflict with a second tenant.

Techniques described herein may help to address the problem of unreliable identification of source of telemetry at the collector device. For example, unreliable identification of the source may occur when using protocols, such as, for example, NetFlow and other protocols where telemetry collection may be initiated from the device side (e.g., a telemetry sensor or network device) and telemetry data is streamed towards the collector device as, for example, UDP messages. The collector device may identify the source (e.g., a telemetry sensor or network device) of the telemetry data, which might not be possible with some protocols like NetFlow due to, for instance, a NAT of the source IP address.

In some examples, there may be disadvantages with configuring a collector device to use only a source IP address of a UDP message to identify a source device. For example, the UDP transport may be less reliable (reliability, packet drop, flow/rate control angle) compared to the transmission control protocol (TCP). In some examples, UDP is not secure. In some examples, protocols like NetFlow, may not contain anything that uniquely identifies the source device at the collector side. There may be one or more deployment difficulties at the collector side in having to implement a work around for NetFlow to identify the packet at the collector, which may prevent a NAT of the source IP address using mechanisms like daemon-set, node-port, which may not be scalable.

Rather than relying solely on a source IP address to identify a source device or on restrictions preventing a NAT of the source IP address, a system may include an "edge device" arranged to decorate a telemetry packet by adding a source identifier (e.g., a device-id). In some examples, the source identifier may be a unique identifier for the source device that is preconfigured by a network administrator. For example, an edge device may append the source identifier to each telemetry packet. In this example, the collector may identify the source device using the source identifier, which may improve an accuracy of identifying the source device compared to systems that use only a source IP address. Without a source identifier, there could be two devices (e.g., two different telemetry sensors for different network devices) using a same source address (private address) and both devices could belong to two different customers. Also, if the collector device is configured to use a source IP address of a packet, there may be a chance that the source IP address may be changed by a NAT either on the way to the collector device and/or at the collector device before processing, thus potentially losing the source identity.

Techniques described herein for decorating a telemetry packet with a source identifier may be implemented without modifying a protocol itself or device side behavior. For example, the edge device may provide an overlay mechanism to decorate telemetry packets by adding a source identifier (e.g., a device-id and custom field). The edge device may provide an overlay mechanism to use grpc remote procedure call (gRPC) or HTTP 2.0 (both TCP-based), which may be relatively reliable and secure transports compared to UDP. For instance, the edge device may "stuff" an entire UDP packet or multiplex multiple packets in the payload as well as extend the payload by adding custom fields like the source identifier (e.g., device-id) along with each UDP packet. In this example, a collector device may receive protocol data units (PDUs) for telemetry data from the edge device and may unpack the PDUs to reliably identify a set of telemetry sensors for the telemetry data. In this way, techniques described herein may configure an edge device and/or a collector device to use telemetry packets with a source identifier such that the system may "withstand" a network address translation (NAT) operation.

Techniques described herein using a source identifier may allow a network device to perform flow control to allow the edge device to decrease or dial-back (or alternatively, increase) a sampling rate on a network device and to guarantee a statistical sampling rather than random drops of telemetry packets. Moreover, techniques described herein include decorating a telemetry packet with the source identifier and a tenant identifier, which may support multi-tenancy. In some examples, the device-id could also be used to support multi tenancy by configuring a tenant identifier (e.g., an orgID) as part of the source identifier (e.g., device-id) such that the collector device may determine which tenant the source device belongs. In this way, the collector device may be configured to determine unambiguously which tenant sent the message indicating telemetry data. Techniques for configuring an edge device to decorate a telemetry packet with a source identifier may support multiple vendors (e.g., network devices configured with different operating software or network devices supporting different protocols).

While the foregoing examples included NetFlow, other flow protocols may be used, such as, for example, sampled flow (sflow), Juniper flow (Jflow), or another flow protocol. Additionally, while techniques described herein may describe an edge device as separate from a network device, some examples may implement techniques for decorating a telemetry packet with a source identifier on source devices (native or as extension) and/or as part of the edge device.

Figure 1:
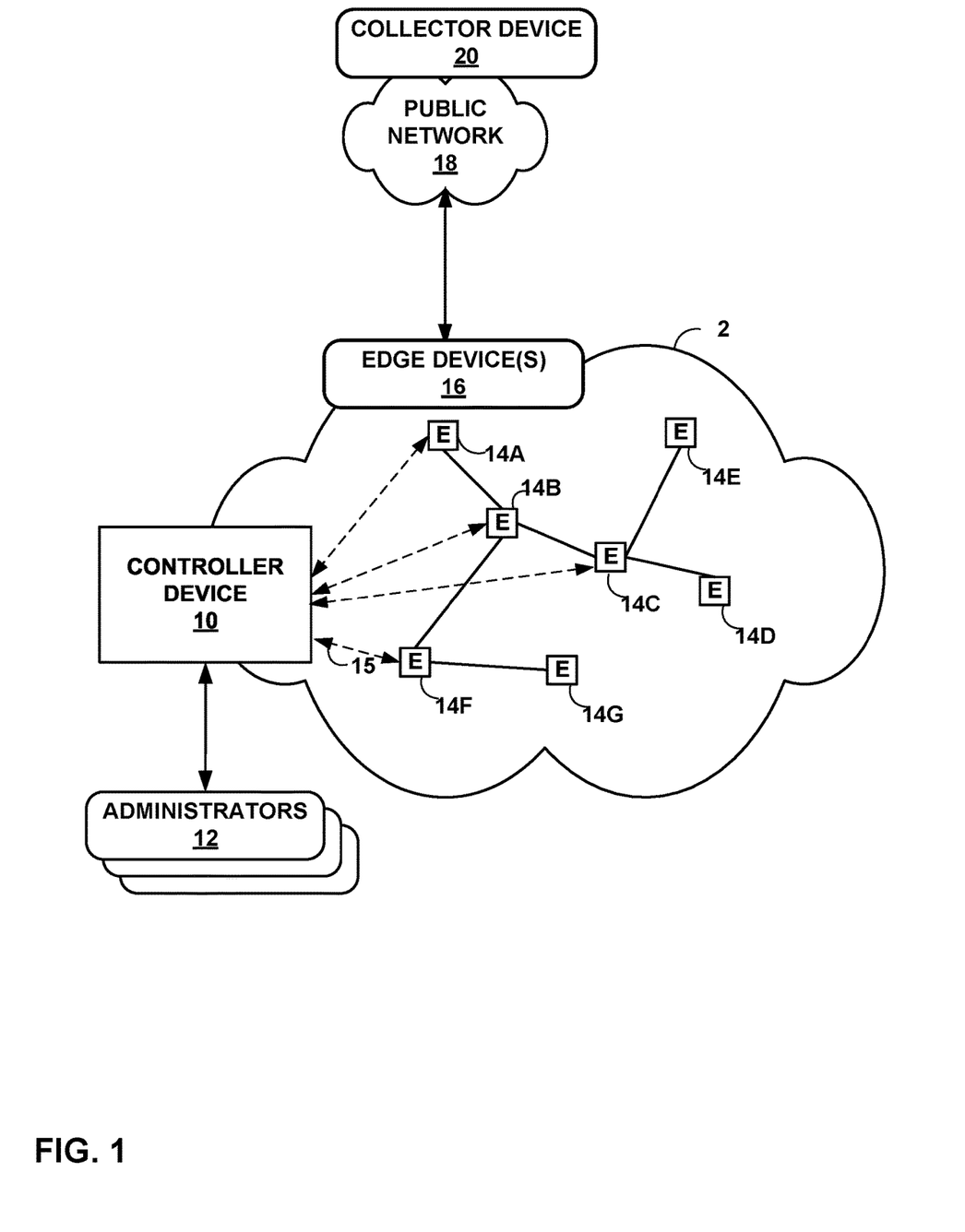
FIG. 1 is a block diagram illustrating an example including network elements of an enterprise network that are managed using a controller device, in accordance with the techniques of the disclosure.

FIG. 1 is a block diagram illustrating an example including network devices of an enterprise network 2 that are managed using a controller device 10. Network elements 14A-14G (collectively, "network elements 14" or "network devices 14") of enterprise network 2 include network elements interconnected via communication links to form a communication topology in order to exchange resources and information. Network elements 14 (also generally referred to as network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Network elements 14 may include one or more sensor devices configured to generate a telemetry packet indicating telemetry data for a plurality of packets output by a respective network element. In some examples, each network elements 14 may be associated with a respective set of sensor devices that are separate (e.g., a separate circuit board or a separate processing device) from network elements 14. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting network elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content. As shown, public network 18 may provide access to collector device 20. Collector device 20 may represent one or more computing devices (e.g., a server, a computer, or a cloud).

Controller device 10 is communicatively coupled to network elements 14 via enterprise network 2. Controller device 10, in some examples, forms part of a device management system, although only one device of the device management system is illustrated for purposes of example in FIG. 1. Controller device 10 may be an example of a central controller. Controller device 10 may be coupled either directly or indirectly to the various network elements 14. Once network elements 14 are deployed and activated, administrators 12 may use controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed network elements 14. Another example device protocol may include NETCONF, however, techniques described herein may be used with other device protocols. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. Another example device protocol may include NETCONF, however, techniques described herein may be used with other device protocols. Further details of the NETCONF protocol can be found in Enns et al., RFC 6241, "Network Configuration Protocol (NETCONF)," Network Working Group, the Internet Engineering Task Force draft, June 2011, available at https://tools.ietf.org/html/rfc6241, the entire contents of which are incorporated herein by reference.

In common practice, controller device 10, also referred to as a network management system (NMS) or NMS device, and network elements 14 are centrally maintained by an IT group of the enterprise. Administrators 12 interact with controller device 10 to remotely monitor and configure network elements 14. For example, administrators 12 may receive alerts from controller device 10 regarding any of network elements 14, view configuration data of network elements 14, modify the configurations data of network elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 use controller device 10 or a local workstation to interact directly with network elements 14, e.g., through telnet, secure shell (SSH), or other such communication sessions. That is, network elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of network elements 14, e.g., network element 14F, using controller device 10, to directly configure network element 14F. In this manner, a user can provide commands in a format for execution directly to network elements 14.

Further, administrators 12 can also create scripts that can be submitted by controller device 10 to any or all of network elements 14. For example, in addition to a CLI interface, network elements 14 also provide interfaces for receiving scripts that specify the commands in accordance with a scripting language. In a sense, the scripts may be output by controller device 10 to automatically invoke corresponding remote procedure calls (RPCs) on the managed network elements 14. The scripts may conform to, e.g., extensible markup language (XML) or another data description language.

Administrators 12 use controller device 10 to configure network elements 14 to specify certain operational characteristics that further the objectives of administrators 12. For example, administrators 12 may specify, for network element 14A, a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of network elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new set of configuration data includes any additional configuration parameters relative to the old intent data model, as well as whether the new set of configuration data modifies or omits any configuration parameters that were included in the old intent data model.

The intent data model may be a unified graph model, while the low-level configuration data may be expressed in YANG, which is described in Bjorklund, "YANG A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured to accept the intent data model (which may be expressed as structured input parameters, e.g., according to YANG or YAML). The functions are also configured to output respective sets of low-level device configuration data changes, e.g., device configuration additions and removals. That is, $y_1=f_1(x)$, $y_2=f_2(x)$, ... $y_N=f_N(x)$.

Controller device 10 may use YANG modeling for intent data model and low-level device configuration models. This data may contain relations across YANG entities, such as list items and containers. Conventionally, controller devices do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

In accordance with the techniques of the disclosure, network element 14A (e.g., a sensor device of network element 14A) may generate a telemetry packet indicating telemetry data for a plurality of packets output by network element 14A of network elements 14. Telemetry data may include any information that can be collected from the network elements 14 using telemetry sensors, such as, for example, OpenConfig, Juniper Telemetry Interface (JTI) Native, netconf, SNMP, syslog, sFlow, NetFlow, or other telemetry sensors. Example metrics in telemetry data may include, but are not limited to, for example, interface states, routing states (including routing protocol information of bgp, isis, mpls etc), system state (cpu usage, memory usage etc), system alarm state (temperature alarm, critical alarm), security related states, hardware chassis related states (fan, power, temperatures), network traffic/flow details, or other telemetry data. For example, network element 14 may send the telemetry packet to edge device 16.

One or more edge devices 16 (referred to herein simply as "edge device 16") may identify the telemetry packet and select a source identifier for network element 14A from a plurality of source identifiers. In some examples, each one of edge devices 16 may be associated with a respective tenant (see FIG. 6).

For example, edge device 16 may be configured to store a preconfigured and unique source identifier for each network element of network elements 14 and associate each source identifier with a network element of network elements 14. For instance, network element 14A may be assigned a first source identifier and network element 14B may be assigned a second source identifier. For instance, administrator 12 may assign the first source identifier to network element 14A and may assign the second source identifier to network element 14B.

In this instance, edge device 16 may be configured to select the first source identifier for telemetry packets output by network element 14A and select the second source identifier for telemetry packets output by network element 14B. For example, in response to determining that a telemetry packet comprises a source IP address corresponding (e.g., matching) network element 14A and that network element 14A is assigned a first source identifier, edge device 16 may select the first source identifier for the telemetry packet. In response, however, to determining that a telemetry packet comprises a source IP address corresponding (e.g., matching) network element 14B and that network element 14A is assigned a second source identifier, edge device 16 may select the second source identifier for the telemetry packet.

Edge device 16 may modify the telemetry packet to further indicate the selected source identifier. Network elements 14 may output the modified telemetry packet to collector device 20. Collector device 20 may associate the telemetry packet with network element 14A based on the selected source identifier and may process the telemetry packet to generate telemetry information. Collector device 20 may output an indication of the telemetry information to controller device 10. For example, controller device 10 may output the telemetry information on a display. The telemetry information can help administrator 12 understand the behavior of network elements 14, which can be further used to take actions or feed to other controller components (e.g., controller device 10). Examples of telemetry information can include Visualizing Top-N talkers in network 2, the status of an interface of network 2, a health of a server, route information, a hardware status of one of network elements 14, if a distributed denial of service (DDoS) attack is happening at network 2, or other telemetry information.

Figure 2:
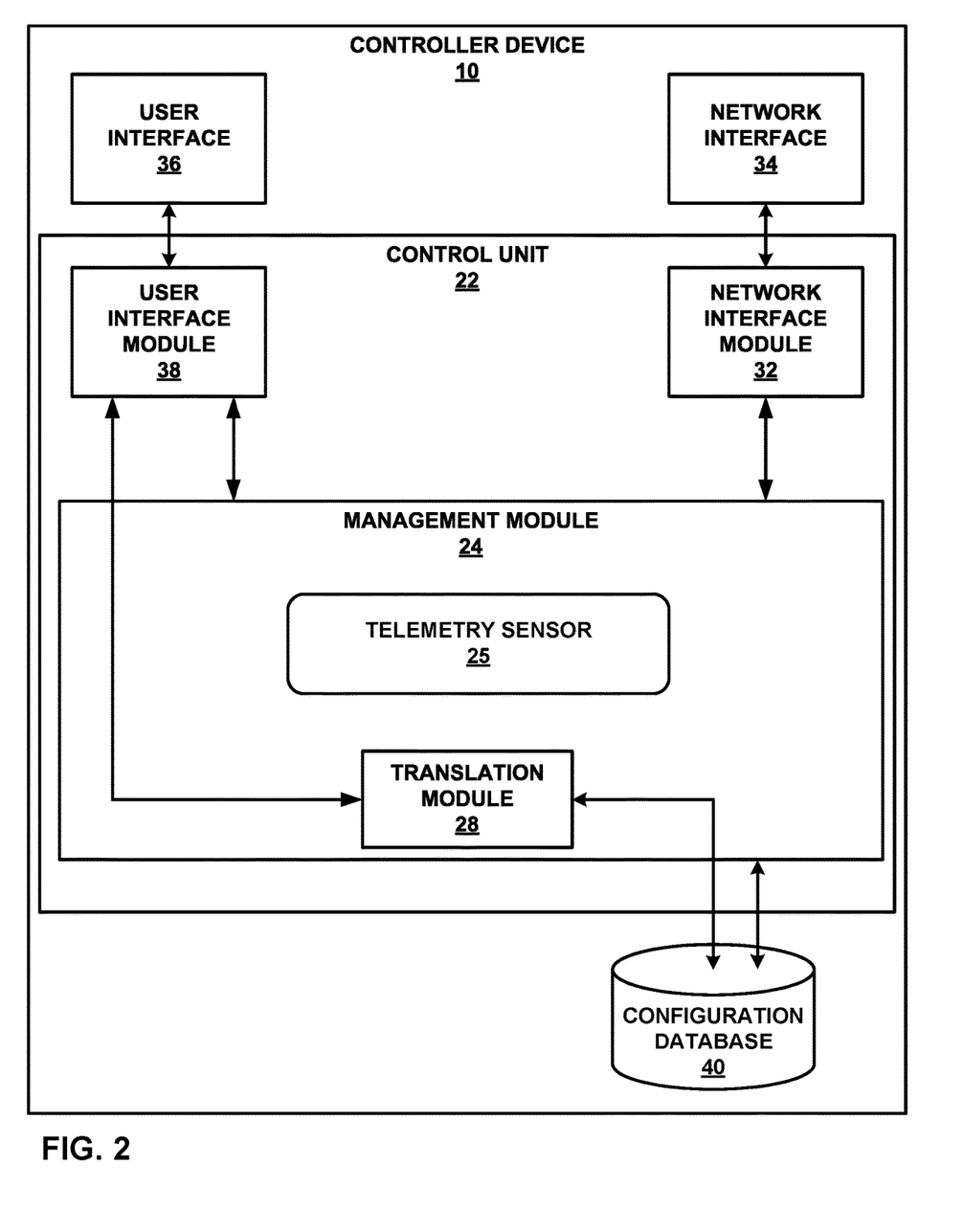
FIG. 2 is a block diagram illustrating an example set of components for the controller device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of network elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 herein and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

Control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., network elements 14 of FIG. 1. Management of a network device includes, for example, configuring the network devices according to instructions received from a user (e.g., administrators 12 of FIG. 1) and providing the user with the ability to submit instructions to configure the network devices. Management of a network device further includes upgrading the network device with updated software, such as an updated software image.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 may include a data structure describing managed network devices, e.g., network elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., network elements 14). Configuration database 40 may include a database that comprises a unified intent data model. In some examples, configuration database 40 may store a low level configuration that includes, for each respective owned resource of a set of owned resources, a pointer indicating an owner for the respective owned resources of network elements 14.

Management module 24 may maintain a data structure in configuration database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure network elements 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github-.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

Telemetry sensor 25 may be configured to generate a telemetry packet indicating telemetry data for a plurality of packets output by network element 14A of network elements 14. Telemetry data may include any information that can be collected from the network elements 14 using telemetry sensors, such as, for example, OpenConfig, Juniper Telemetry Interface (JTI) Native, netconf, SNMP, syslog, sFlow, NetFlow, or other telemetry sensors. Example metrics in telemetry data may include, but are not limited to, for example, interface states, routing states (including routing protocol information of bgp, isis, mpls etc), system state (cpu usage, memory usage etc), system alarm state (temperature alarm, critical alarm), security related states, hardware chassis related states (fan, power, temperatures), network traffic/flow details, or other telemetry data.

Figure 3:
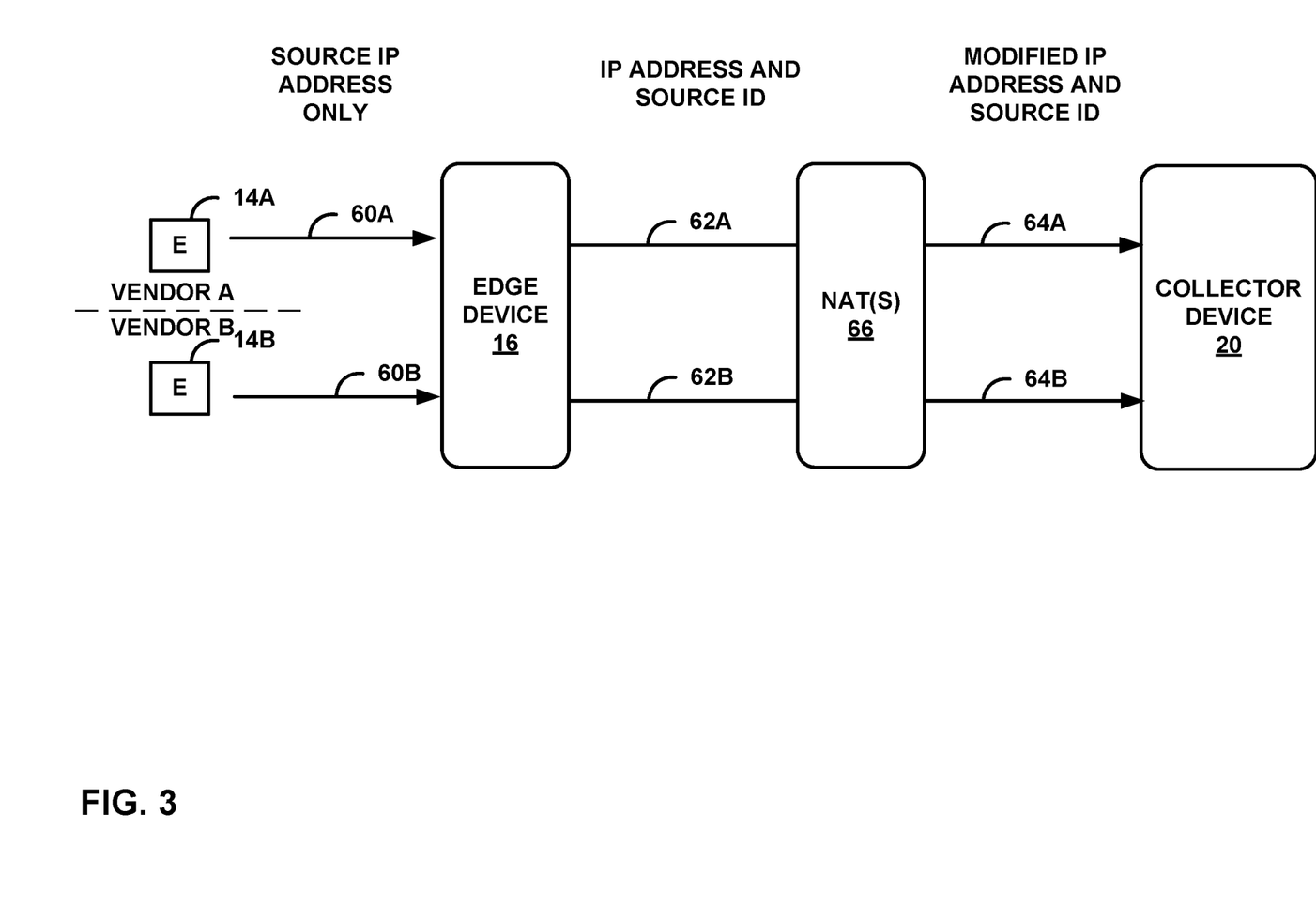
FIG. 3 is a block diagram illustrating an example of network devices, an edge device, one or more network address translators (NATs), and a collector device for processing telemetry packets, in accordance with the techniques of the disclosure.

FIG. 3 is a block diagram illustrating an example of network devices 14, edge device 16, one or more network address translators (NATs) 60, and collector device 20 for processing telemetry packets, in accordance with the techniques of the disclosure. In the example of FIG. 3, two network elements 14 are illustrated, one (14A) associated with a first vendor ("Vendor A") and another (14B) associated with a second vendor ("Vendor B"). In the example illustrated in FIG. 3, and for ease of illustration, only two elements 14 are shown, although any number of elements 14 may be used in other examples.

Network element 14A may generate a telemetry packet 60A indicating telemetry data for a plurality of packets output by network element 14A. In some examples, network element 14A may generate telemetry packet 60A to indicate a source IP address of network element 14A. Network element 14B may generate a telemetry packet 60B indicating telemetry data for a plurality of packets output by network element 14B. In some examples, network element 14B may generate telemetry packet 60B to indicate a source IP address of network element 14B.

Edge device 16 may identify telemetry packet 60A and select a first source identifier for network element 14A from a plurality of source identifiers. Similarly, edge device 16 may identify telemetry packet 60B and select a second source identifier for network element 14B from the plurality of source identifiers. Edge device 16 may modify telemetry packet 60A to further indicate the first selected source identifier to generate a modified telemetry packet 62A. Similarly, edge device 16 may modify telemetry packet 60B to further indicate the second selected source identifier to generate a modified telemetry packet 62B. NAT 66 may translate the source IP address for network element 14A to a modified IP address that is different from the source IP address for network element 14A. As such, NAT 66 generates telemetry packet 64A from telemetry packet 62A. In some examples, NAT 66 may translate the source IP address for network element 14B to a modified IP address that is different from the source IP address for network element 14B. As such, NAT 66 generates telemetry packet 64B from telemetry packet 62B.

Collector device 20 may associate telemetry packet 64A with network element 14A based on the first selected source identifier of telemetry packet 64A and may process telemetry packet 64A to generate telemetry information for network element 14A. Similarly, collector device 20 may associate telemetry packet 64B with network element 14B based on the second selected source identifier of telemetry packet 64B and may process telemetry packet 64B to generate telemetry information for network element 14B.

As shown, techniques for configuring edge device 16 to decorate a telemetry packet with a source identifier may support multiple vendors (e.g., network devices configured with different operating software or network devices supporting different protocols). For example, network element 14A may be configured by a first vendor ("VENDOR A")

and network element 14B may be configured by a second vendor ("VENDOR B") that is different from the first vendor.

Figure 4A:
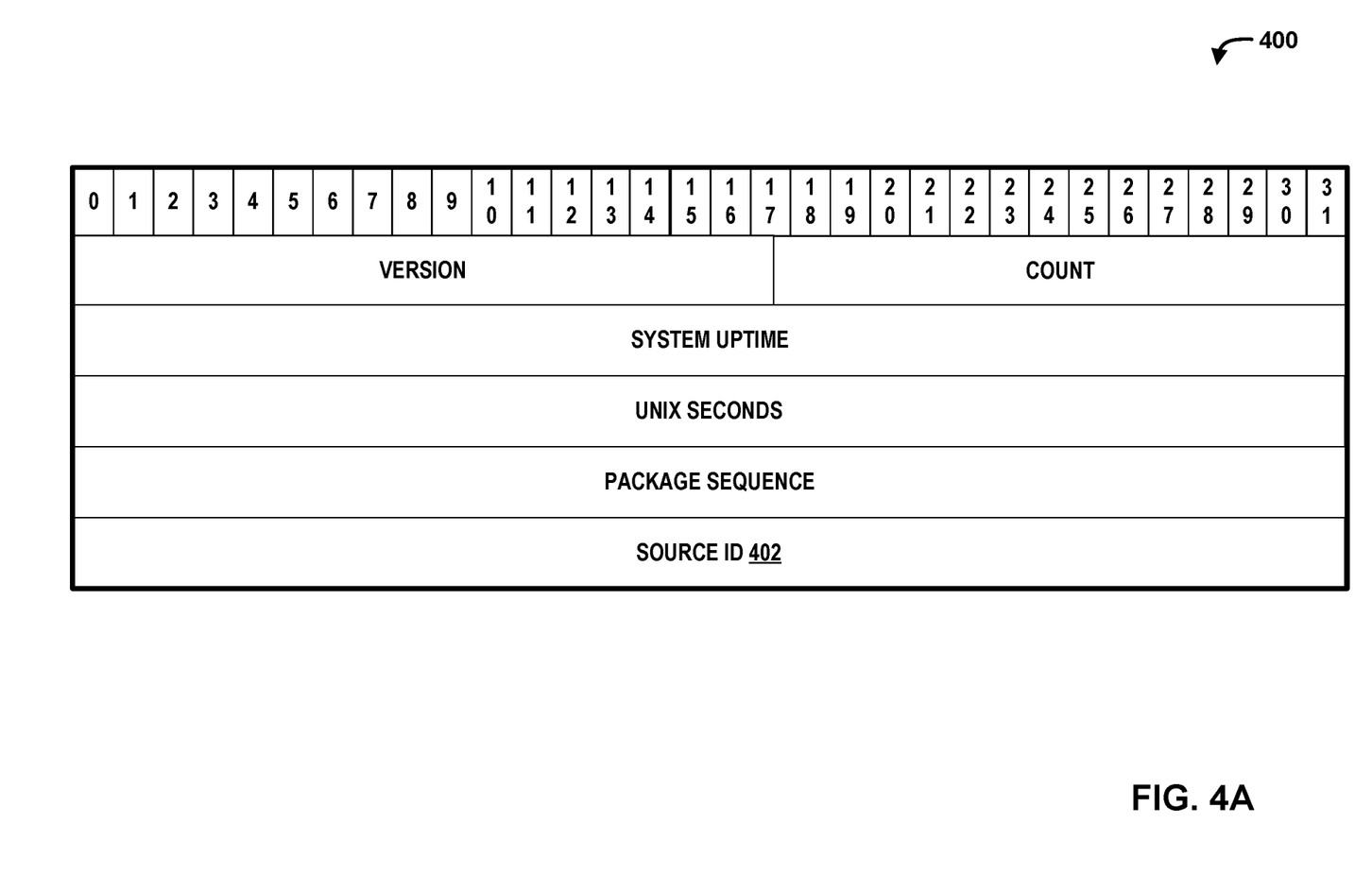
FIG. 4A is a conceptual diagram illustrating an example header for a telemetry packet generated by an example telemetry sensor, in accordance with the techniques of the disclosure.

FIG. 4A is a conceptual diagram illustrating an example header 400 for a telemetry packet generated an example telemetry sensor (e.g., a NetFlow sensor), in accordance with the techniques of the disclosure. FIG. 4B is a conceptual diagram illustrating example details 410 for the header of FIG. 4A, in accordance with the techniques of the disclosure. In the example of FIGS. 4A, 4B, collector device 20 may be configured to use a source IP address plus source ID 402 to associate a telemetry packet with a unique instance of a particular device. However, without a source identifier, there could be two devices (e.g., two different telemetry sensors for different network devices) using a same source address (private address) and both devices could belong to two different customers. Also, if collector device 20 is configured to use a source IP address of a packet (and source ID 402), there may be a chance that the source IP address may be changed by a NAT either on the way to the collector device and/or at the collector device before processing, thus potentially losing the source identity.

While the foregoing examples were described in the context of NetFlow, other flow protocols may be used, such as, for example, sampled flow (sflow), Juniper flow (Jflow), or another flow protocol. Additionally, while techniques described herein may describe an edge device as separate from a network device, some examples may implement techniques for decorating a telemetry packet with a source identifier on source devices (native or as extension) and/or as part of the edge device.

Figure 5:
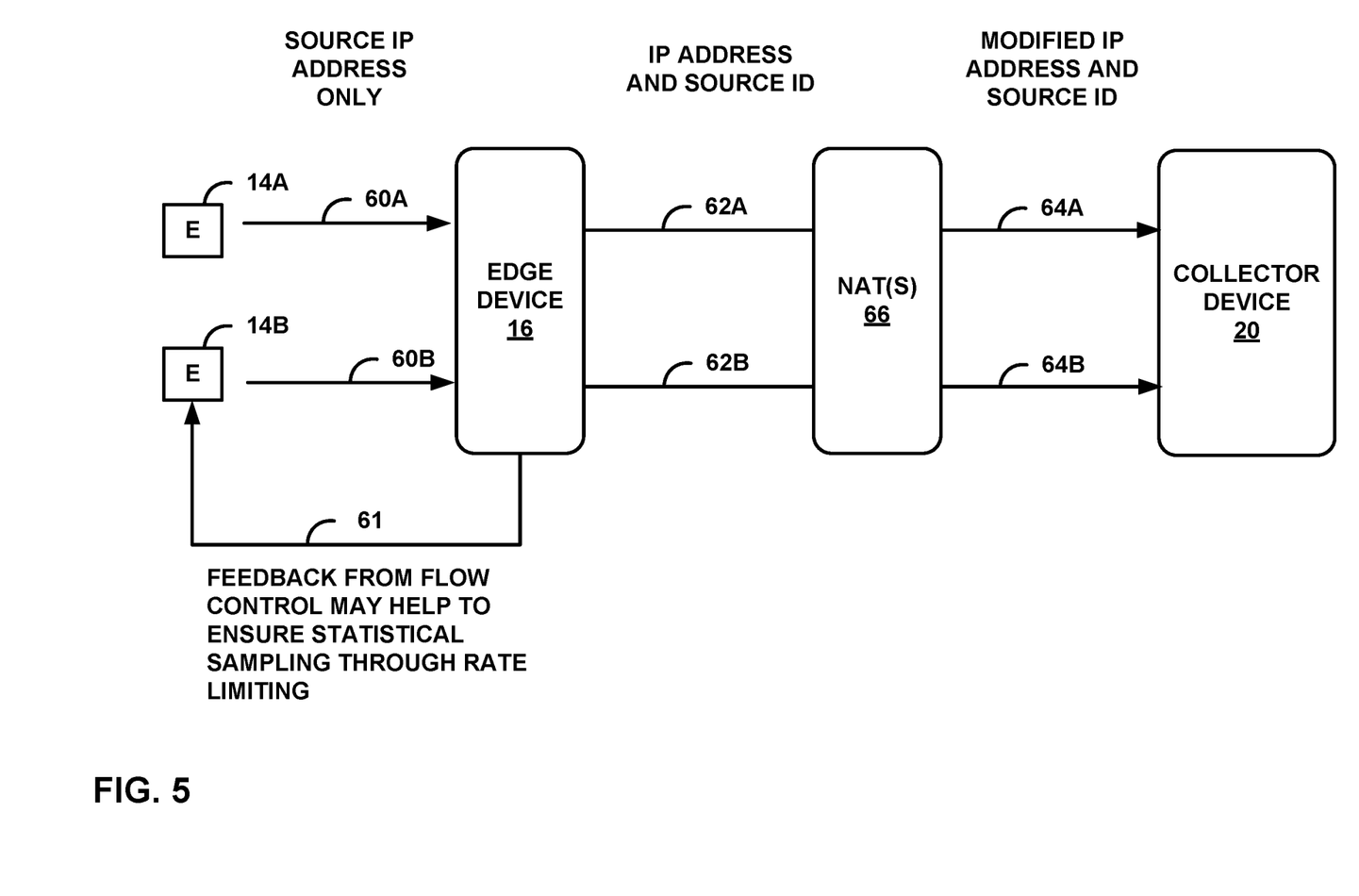
FIG. 5 is a block diagram illustrating an example of network devices, an edge device, one or more NATs, and a collector device for rate control of a network device, in accordance with the techniques of the disclosure.

FIG. 5 is a block diagram illustrating an example of network devices 14, edge device 16, one or more NATs 60, and collector device 20 for rate control of a network device, in accordance with the techniques of the disclosure. In this example, edge device 16 may output feedback information 61 based on telemetry packet 60B to network element 14B. Network element 14B may be configured to modify a sampling rate for the plurality of packets based on feedback information 61. Configuring network element 14B to modify the sampling rate may be used to help mitigate dropped packets and/or socket congestion, which can happen with an aggressive sampling rate set on network element 14B. With feedback information 61, network element 14B may be configured with a sampling rate or packet export rate as needed and as supported for the telemetry protocol, which may help to avoid a random drop of packets and may help to reduce the congestion due to telemetry. For example, in response to an sFlow or NetFlow packet sampling rate change from 1:1000 to 1:10000, network element 14B may be configured to change a streaming native telemetry packet export rate from a frequency of 60 seconds to 120 seconds. As used herein, packet export rate may refer to an interval at which the telemetry information is exported from device to collector device 20.

Figure 6:
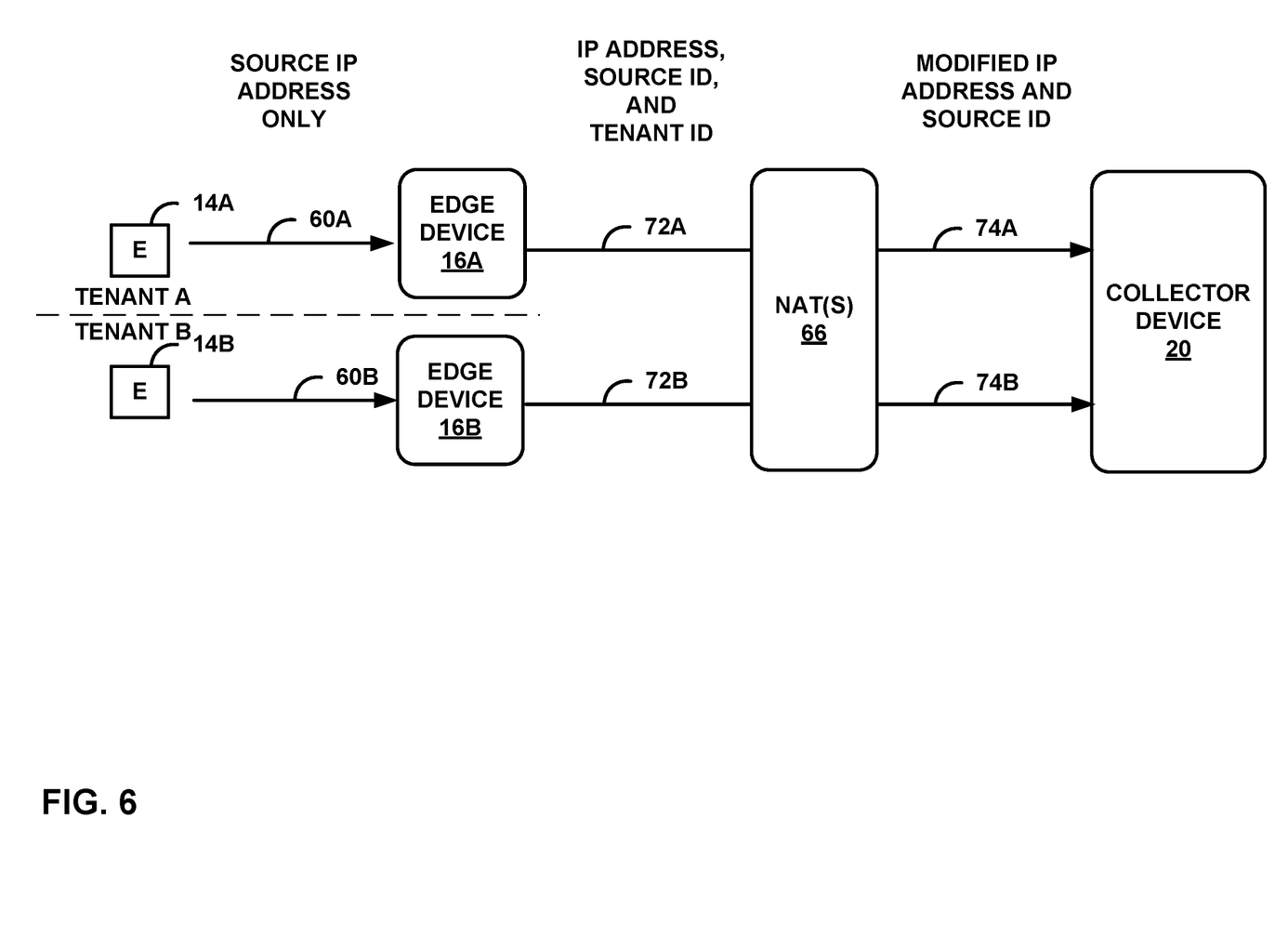
FIG. 6 is a block diagram illustrating an example of network devices, an edge device, one or more NATs, and a collector device for processing telemetry packets from different tenants, in accordance with the techniques of the disclosure.

FIG. 6 is a block diagram illustrating an example of network devices 14, edge device 16, one or more NATs 60, and collector device 20 for processing telemetry packets from different tenants, in accordance with the techniques of the disclosure. In the example of FIG. 6, network element 14A may generate a telemetry packet 60A indicating telemetry data for a plurality of packets output by network element 14A. Network element 14B may generate a telemetry packet 60B indicating telemetry data for a plurality of packets output by network element 14A.

In the example of FIG. 6, one or more edge devices 16 may include edge device 16A, which is associated with (e.g., assigned to) tenant A, and edge device 16B, which is associated with (e.g., assigned to) tenant B. Edge device 16A may identify telemetry packet 60A and select a first source identifier for network element 14A from a plurality of source identifiers. Similarly, edge device 16B may identify telemetry packet 60B and select a second source identifier for network element 14B from the plurality of source identifiers. Moreover, edge device 16A may select a first tenant identifier for network element 14A from a plurality of tenant identifiers. Edge device 16B may select a second tenant identifier for network element 14B from the plurality of tenant identifiers. Edge device 16A may modify telemetry packet 60A to further indicate the first selected source identifier and the first tenant identifier to generate a modified telemetry packet 72A. Similarly, edge device 16B may modify telemetry packet 60B to further indicate the second selected source identifier and the second tenant identifier to generate a modified telemetry packet 72B.

NAT 66 may translate the source IP address for network element 14A to a modified IP address that is different from the source IP address for network element 14A. As such, NAT 66 generates telemetry packet 74A from telemetry packet 72A. In some examples, NAT 66 may translate the source IP address for network element 14B to a modified IP address that is different from the source IP address for network element 14B. As such, NAT 66 generates telemetry packet 74B from telemetry packet 62B. In some examples, NAT 66 may be omitted.

Collector device 20 may associate telemetry packet 74A with network element 14A based on the first selected source identifier and the first tenant identifier of telemetry packet 74A and may process telemetry packet 74A to generate telemetry information for network element 14A. Similarly, collector device 20 may associate telemetry packet 74B with network element 14B based on the second selected source identifier and the second tenant identifier of telemetry packet 74B and may process telemetry packet 74B to generate telemetry information for network element 14B.

Figure 7:
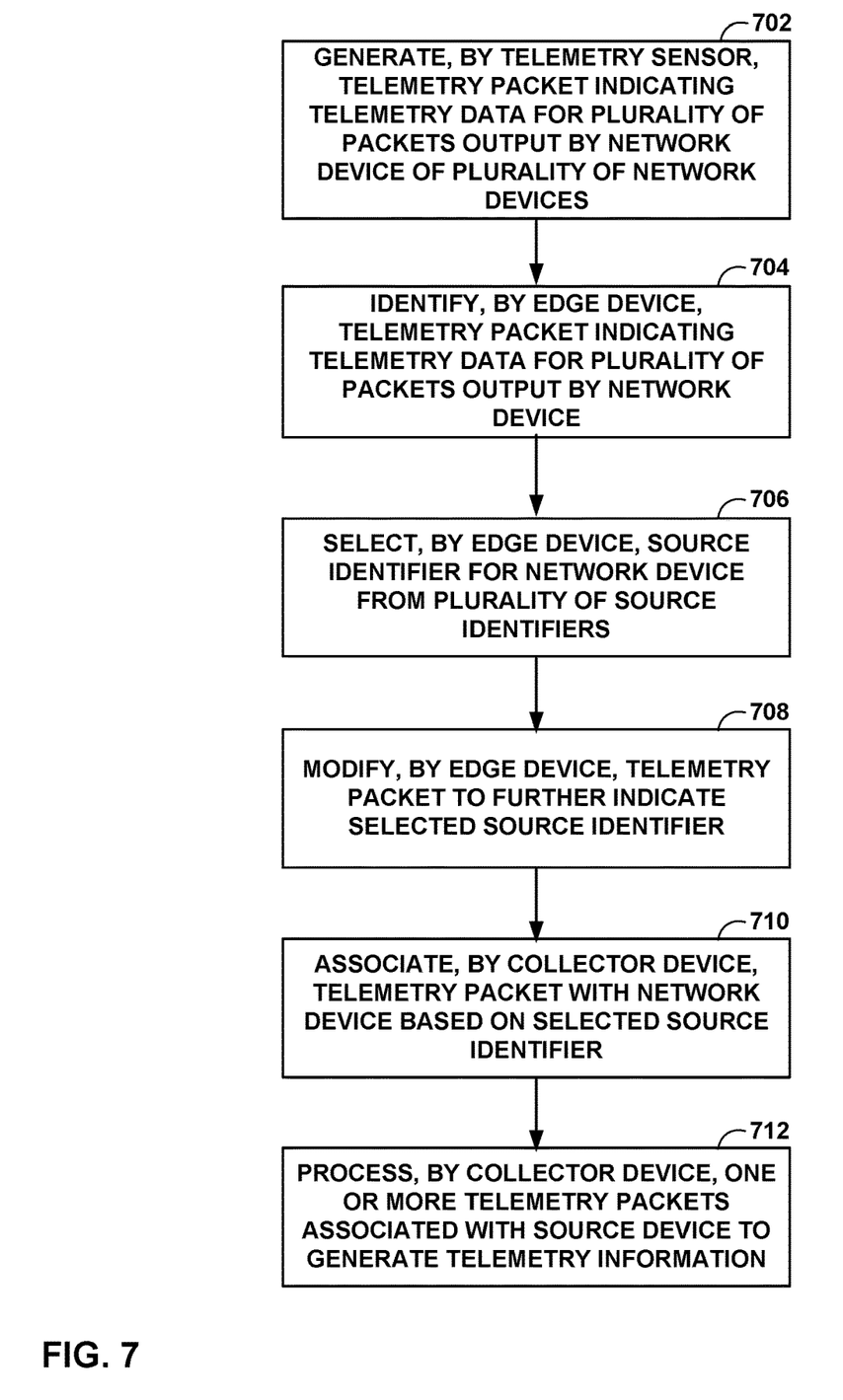
FIG. 7 is a flow chart illustrating an example process for a resource, in accordance with the techniques of the disclosure.

FIG. 7 is a flow chart illustrating an example process for a resource, in accordance with the techniques of the disclosure. FIG. 7 is discussed with reference to FIGS. 1-6 for example purposes only. In the example of FIG. 7, a sensor device for network element 14A may generate a telemetry packet indicating telemetry data for a plurality of packets output by network device 14A of network devices 14 (702). For example, network element 14A (e.g., a telemetry sensor included within network element 14A) may assign the plurality of packets to a source IP address and a destination address and network device 14A may generate each packet of the plurality of packets to comprise the source IP address and the destination address. The telemetry packet may be compliant with NetFlow. However, the telemetry packet may also be compliant with other flow protocols, such as, for example, sampled flow (sflow), Juniper flow (Jflow), or another flow protocol.

Edge device 16 may identify the telemetry packet indicating telemetry data for a plurality of packets output by network device 14A (704). Edge device 16 may select a source identifier for network element 14A from a plurality of source identifiers (706). For example, edge device 16 may be configured to store a preconfigured and unique source identifier for each network element of network elements 14. In some examples, edge device 16 may use a source IP address of a received telemetry packet as an input to a function (e.g., a look-up table) that generates the selected source identifier.

Edge device 16 may modify the telemetry packet to further indicate the selected source identifier (708). For example, edge device 16 may modify a packet payload (e.g., source ID 402 of FIG. 4A) of the telemetry packet to include the selected source identifier. Edge device 16 (e.g., with network elements 14) may output the modified telemetry packet to collector device 20. In some examples, edge device 16 may receive the telemetry packet using a connectionless protocol. Examples of connectionless protocols may include, for example, telemetry mechanisms using UDP transports (e.g., sFlow, Juniper Telemetry Interface (JTI) Native, syslog, etc.), which may be inherently less reliable than connection-oriented protocols (e.g., TCP-based protocols) and may drop a packet and may not be secure compared to connection-oriented protocols. In some examples, edge device 16 may establish a connection between edge device 16 and collector device 20 and output, via the connection, the modified telemetry packet to collector device 16. For instance, edge device 16 may convert the telemetry packet from UDP to a connection-oriented protocol, such as, for example, gRPC or HTTP 2.0 (both TCP-based reliable and secure transports).

Collector device 20 may associate the telemetry packet with network element 14A based on the selected source identifier (710). Collector device 20 may process one or more flows and/or streams associated with the source device (e.g., network element 14A) to generate telemetry information. Collector device 20 may output an indication of the telemetry information to controller device 10. For example, controller device 10 may output the telemetry information on a display.

In some examples, the telemetry packet may further indicate a source IP address for network device 14A. In this example, a NAT may be configured to change the source IP address for network device 14A to a translated IP address different from the source IP address for network device 14A. In accordance with the techniques of the disclosure, edge device 16 may output the modified telemetry packet that indicates the selected source identifier and collector device 20 may associate the telemetry packet with network element 14A based on the selected source identifier. In this way, edge device 16 may help to improve an accuracy of associating telemetry packets with a network element, particularly in instances where a NAT is used.

In some examples, edge device 16 may output feedback information based on the telemetry packet to network device 14A. In this example, network device 14A may be enabled to (e.g., configured to) modify (e.g., increase or decrease) a set of parameters controlling the telemetry export rate (e.g., a sampling rate or sensing rate) based on the feedback information. For example, network device 14A may be configured to change, based on the feedback information, a sampling rate for streaming telemetry sensors, such as, for example, juniper native telemetry (JTI), openconfig, or other streaming telemetry sensors. In some examples, network device 14A may be configured to change, based on the feedback information, a sensor rate for sensors configured for sFlow, NetFlow, or other telemetry sensors.

Edge device 16 may select a tenancy identifier for the plurality of packets from a plurality of tenancy identifiers. In this example, edge device 16 may modify the telemetry packet to indicate the selected source identifier and to further indicate the selected tenancy identifier. The selected tenancy identifier may be preconfigured by administrator 12. For example, administrator 12 may assign a first tenancy identifier to network device 14A that is associated with tenant 'A' and may assign a second tenancy identifier to network device 14B that is associated with tenant 'B'. The first tenancy identifier and second tenancy identifier may be different (e.g., unique). Edge device 16 may be configured to use zero or more identifiers in addition to a source identifier and/or a tenancy identifier.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
  associating, by an edge device implemented in circuitry, a source identifier with a network device;
  in response to determining that a telemetry packet indicates a source IP address matching the network device and the associating of the source identifier with the network device, modifying, by the edge device, the telemetry packet that indicates the source IP address to further indicate the source identifier; and
  outputting, by the edge device, the modified telemetry packet, wherein the modified telemetry packet indicates the source IP address and further indicates the source identifier.

2. The method of claim 1, wherein the network device is configured to assign a plurality of packets to the source IP address and a destination address, wherein the plurality of packets includes the telemetry packet, and wherein the network device is configured to generate each packet of the plurality of packets to comprise the source IP address and the destination address.

3. The method of claim 1, wherein the telemetry packet is output by a telemetry sensor.

4. The method of claim 3, wherein the telemetry sensor is included within the network device.

5. The method of claim 1, wherein a network address translator (NAT) is configured to change the source IP address for the network device to a translated IP address different from the source IP address for the network device.

6. The method of claim 1, further comprising outputting, by the edge device, feedback information based on the telemetry packet to the network device and enabling the network device to modify one or more of a sampling rate or a sensor rate for a plurality of packets output by the network device based on the feedback information.

7. The method of claim 1, further comprising selecting, by the edge device, a tenancy identifier from a plurality of tenancy identifiers, wherein modifying the telemetry packet further comprises modifying the telemetry packet to indicate the source IP address and the source identifier and to further indicate the selected tenancy identifier.

8. The method of claim 7, wherein the selected tenancy identifier is preconfigured by an administrator.

9. The method of claim 1, wherein the source identifier is preconfigured by an administrator.

10. The method of claim 1, wherein outputting the modified telemetry packet comprises establishing a connection between the edge device and a collector device and outputting, via the connection, the modified telemetry packet to the collector device.

11. The method of claim 1, wherein the telemetry packet is compliant with NetFlow, OpenConfig, Juniper Telemetry Interface (JTI) Native, netconf, SNMP, syslog, or sFlow.

12. A system comprising:
processing circuitry; and
non-transitory computer-readable storage medium comprising one or more instructions that, when executed by the processing circuitry, cause the processing circuitry to:
associate a source identifier with a network device;
in response to a determination that a telemetry packet indicates a source IP address matching the network device and the association of the source identifier with the network device, modify the telemetry packet that indicates the source IP address to further indicate the source identifier; and
output the modified telemetry packet, wherein the modified telemetry packet indicates the source IP address and further indicates the source identifier.

13. The system of claim 12, wherein the network device is configured to assign a plurality of packets to the source IP address and a destination address, wherein the plurality of packets includes the telemetry packet, and wherein the network device is configured to generate each packet of the plurality of packets to comprise the source IP address and the destination address.

14. The system of claim 12, wherein the telemetry packet is output by a telemetry sensor.

15. The system of claim 14, wherein the telemetry sensor is included within the network device.

16. The system of claim 12, wherein a network address translator (NAT) is configured to change the source IP address for the network device to a translated IP address different from the source IP address for the network device.

17. The system of claim 12, wherein the instructions further cause the processing circuitry to output feedback information based on the telemetry packet to the network device and enable the network device to modify one or more of a sampling rate or a sensor rate for a plurality of packets output by the network device based on the feedback information.

18. The system of claim 12, wherein the one or more instructions further cause the processing circuitry to select a tenancy identifier from a plurality of tenancy identifiers, wherein to modify the telemetry packet, the one or more instructions cause the processing circuitry to modifying the telemetry packet to indicate the source IP address and the source identifier and to further indicate the selected tenancy identifier.

19. The system of claim 18, wherein the selected tenancy identifier is preconfigured by an administrator.

20. Non-transitory computer-readable storage media comprising one or more instructions that cause processing circuitry to:
associate a source identifier with a network device;
in response to a determination that a telemetry packet indicates a source IP address matching the network device and the association of the source identifier with the network device, modify the telemetry packet that indicates the source IP address to further indicate the source identifier; and
output the modified telemetry packet, wherein the modified telemetry packet indicates the source IP address and further indicates the source identifier.

* * * * *